F. N. CONNET.
FLUID METER.
APPLICATION FILED APR. 28, 1910.
1,208,494.
Patented Dec. 12, 1916.
2 SHEETS—SHEET 1.
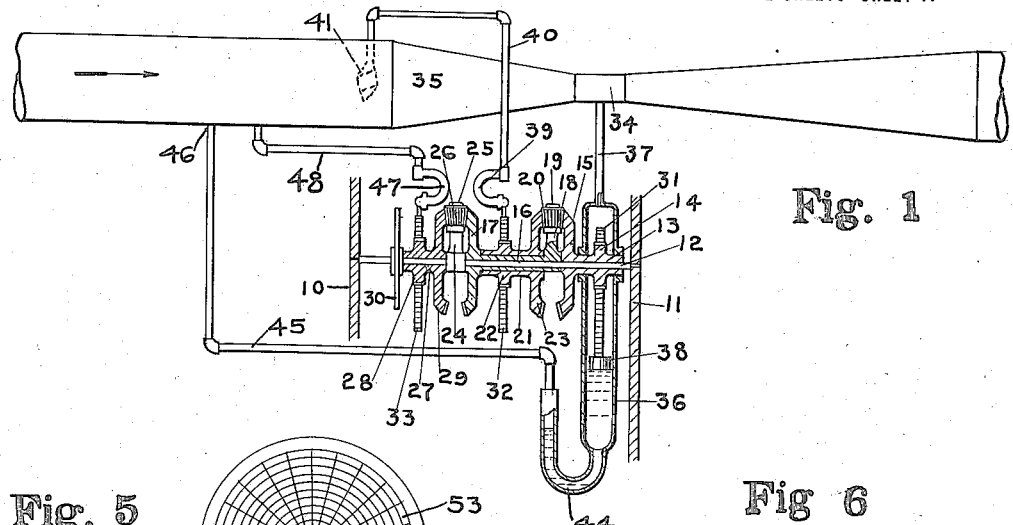
Fig. 1
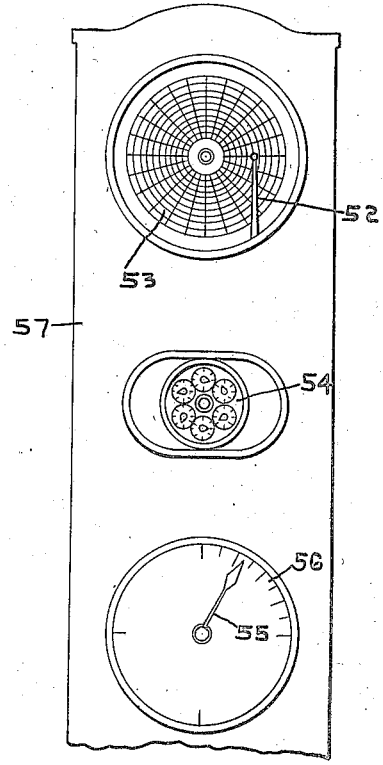
Fig. 5
Fig 6
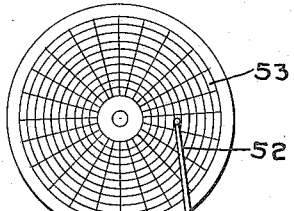
Fig. 4
WITNESSES
Herbert L. Kelley
E. J. Ogden
INVENTOR
Frederick N. Connet
BY
Howard E. Barlow
ATTORNEY F. N. CONNET.
FLUID METER.
APPLICATION FILED APR. 28, 1910.
1,208,494.
Patented Dec. 12, 1916.
2 SHEETS—SHEET 2.
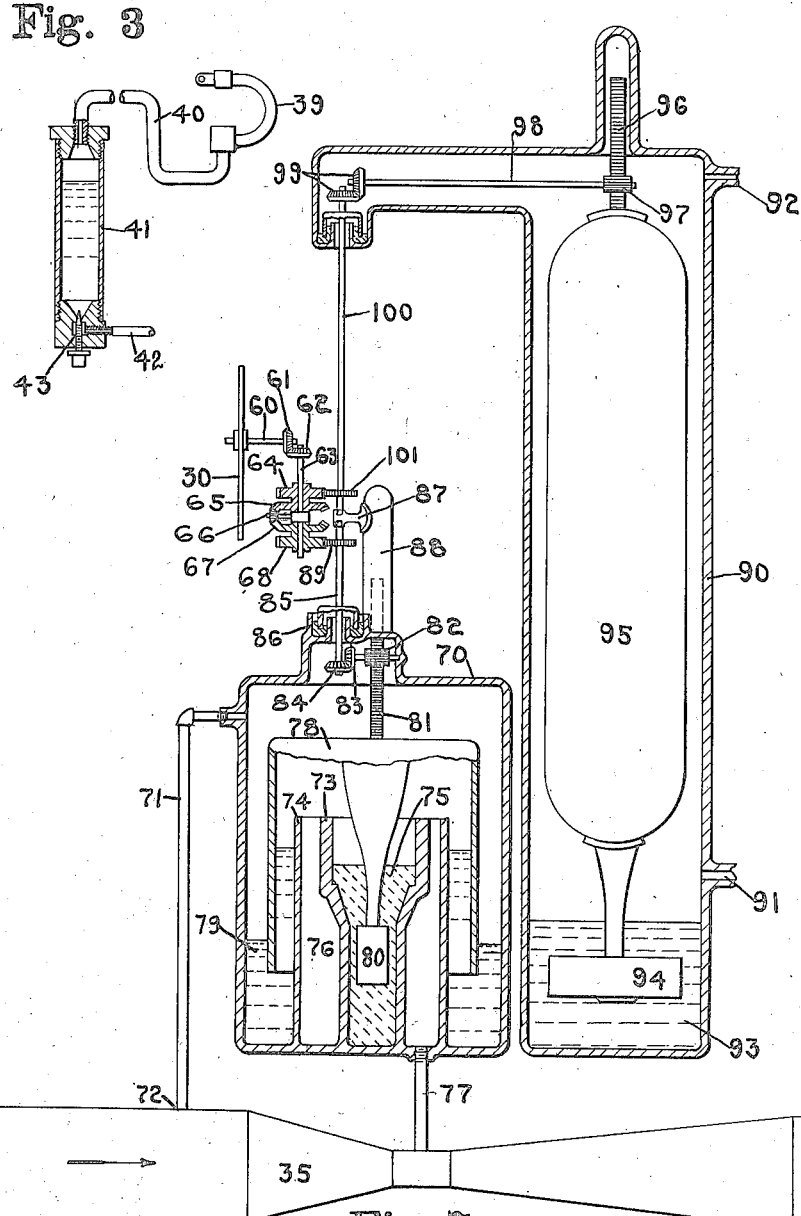
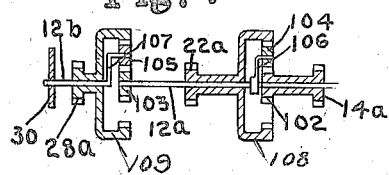
WITNESSES
Herbert L. Kelley
E. D. Ogden
INVENTOR
Frederick N. Connet
BY
Howard E. Barlow
ATTORNEY

UNITED STATES PATENT OFFICE.

FREDERICK N. CONNET, OF PROVIDENCE, RHODE ISLAND.

FLUID-METER.

1,208,494.  Specification of Letters Patent.  Patented Dec. 12, 1916.

Application filed April 28, 1910. Serial No. 558,228.

*To all whom it may concern:*

Be it known that I, FREDERICK N. CONNET, a citizen of the United States, residing at Providence, in the county of Providence and State of Rhode Island, have invented certain new and useful Improvements in Fluid-Meters, of which the following is a specification, reference being had therein to the accompanying drawing.

This invention relates to apparatus for measuring volume, weight, and energy of gases, vapors or liquids, the especial object of the present invention being to provide an improved apparatus of this character which will show in any suitable manner, as by a counter, or a diagram, or a pointer and scale, the effects of several variables.

With these and other objects in view, the invention consists of certain novel features of construction, as will be more fully described and particularly pointed out in the appended claims.

In the accompanying drawings: Figure 1— is an elevation, partly diagrammatic, of so much of my invention in one of its embodiments as is necessary to an understanding of the same. Fig. 2— is a similar view, illustrating a different embodiment of the invention. Fig. 3— is a detail sectional elevation of a form of thermometer bulb which may be employed for obtaining the effects of changes in temperature of the fluid. Fig. 4— is a detail view of a system of differential pulleys which may be employed instead of the differential gearing shown in Figs. 1 and 2. Figs. 5 and 6— are detail elevations of portions of an instrument which may be employed for showing the action of the proportioning mechanism. Fig. 7— is a detail sectional view of another form of differential gearing that may be employed.

Referring first to Fig. 1, portions of the front and rear walls of a meter casing are indicated respectively at 10 and 11, said walls having bearings for a cylindrical shaft 12.

It is found experimentally that the relation $$\text{Log. } Q = \text{log. } \phi H + \text{log. } \psi P + \text{log. } XT + \text{log. } K$$

is very approximately true, where:—Q is the actual flow at any given temperature (T) and pressure (P), $\phi H$ the quantity passing at some standard temperature and pressure, $\psi P$ a function of the observed pressure P XT a function of the observed temperature T, and K is the meter constant. Since the density W of a gas is a function of its temperature and pressure we may replace, $$\text{Log. } \psi P + \text{log. } XT$$

by log. $fW$ so that $$\text{Log. } Q = \text{log. } \phi H + \text{log. } fW + \text{log. } K$$

where $fW$ is a function of the observed density W. The values of H. P. T. and W. are measured by means of suitable devices hereinafter described and thence by means of any suitable mechanism movements proportional to log. $\phi H$, log. $\psi P$, log. XT and log. $fW$ are obtained. These movements are preferably added together by means of a multiple differential gear so arranged that the movement transmitted by it is proportional to the algebraic sum of the movements transmitted to it.

On said shaft 12, near the rear end thereof, is mounted a sleeve 13 having a pinion 14 and a bevel-gear 15. Next to the sleeve 13 is a sleeve 16 having at one end a bevel-gear 17 and at the other end an arm 18 having a spindle 19 on which is mounted a bevel-pinion 20 meshing with gear 15. Mounted on the sleeve 16 is a sleeve 21 having a pinion 22 and a bevel-gear 23 which is in mesh with the bevel-pinion 20. Next in front of the gear 17, and mounted on shaft 12, is an arm 24 having a spindle 25 on which is mounted a bevel-pinion 26. And next to the arm 24 is a sleeve 27 having a pinion 28, and having also a bevel-gear 29 in mesh with bevel pinion 26. Through this differential gearing, motion is transmitted to a cam 30 from which is to be obtained the motion that will control the showing of the meter as hereinafter explained.

Meshing with the three pinions 14, 22 and 28 are three racks 31, 32 and 33 respectively, and it will be readily understood that varying amounts of reciprocating movements of the three racks will alter the position of the cam 30 in a manner that is dependent upon the movements of said racks.

In the utilization of the invention indicated in Fig. 1, the movements or position of rack 31 are controlled by the pressure in the throat 34 of a "Venturi tube" 35 in a manner similar to that disclosed in my application 452,750, filed September 12, 1908. In the present case, I provide a casing 36 which is connected to said throat by a pipe 37. A float 38 at the lower end of said rack 31 is supported by a body of mercury in the casing 36.

To one end of rack 32 is connected one end of a Bourdon tube 39 the other end of which is connected by means of a pipe 40 with a thermometer bulb 41 suitably supported in the main 35, which thermometer may be of the type shown in Fig. 3. This bulb is composed of steel or other suitable material adapted to contain a liquid whose vapor pressure is to be a measure of the temperature of the fluid passing through the tube 35. Said liquid may be anhydrous ammonia, and it may be forced into the bulb by any suitable device connected to a pipe 42, the entrance to the bulb being then securely sealed by a needle valve 43. The volume of the bulb is greater than that of the pipe 40 and Bourdon tube 39, while the volume of ammonia in the bulb is intermediate those two. Therefore the maximum vapor pressure in the bulb, pipe and Bourdon tube is always that which is due to the temperature of the fluid in tube 35 imparted to said bulb. This provides for movements of rack 32, sleeve 21 and bevel gear 23 according to pressure variations due to changes of temperature of the fluid passing through the Venturi tube.

The lower part of casing 36 has a well 44 which is connected by a pipe 45 with the up-stream side of the Venturi-tube, at 46. Variations of speed, and consequently quantity or volume, of fluid passing through the Venturi-tube, cause more or less variations in the relative pressures at the points 46 and 34, and therefore cause changes in the level of the mercury in the casing 36 and alter the height of the float 38, and through the rack 31, pinion 14 and sleeve 13, rotate the bevel gear 15 in one direction or the other.

The rack 33 is connected at one end to a Bourdon tube 47 which is connected by a pipe 48 to the up-stream side of the Venturi-tube so that the fluid in the said pipe 48 and Bourdon tube 47 will be under the same pressure as that in the main. The rack 33 actuates the pinion 28 and the bevel gear 29 to an amount according to variations in pressure alone. Since the arm 18 moves through half the angle of either of the wheels 15, 23, the algebraic sum of half the motions imparted to either or both will be transmitted to the arm 18. There is connected to a third wheel 17, one of a pair of wheels which with their pinion 26 is identical with the first pair. One quarter of the motion of the first two wheels 15, 23 and one half of the motion of the fourth wheel 29 are thus transmitted to the arm 24 carrying the second pinion 26. If then the movements representing log. $\varphi$H and log. XT let us say are multiplied four times and imparted to the wheels 15, 23 by means of pinions 22, 14 fast with them and the movement representing log. $\psi$P is multiplied by two and imparted to the wheel 29 by means of the pinion 28 fast with it, the angular movement of the arm 24 will be that desired. It will therefore be understood that the effects of three different pressures are obtained at the cam 30 due to the equalizing gear described, one being the pressure of the fluid in the main, another that resulting from temperature of that fluid, and another that which results from the speed of flow of the fluid. The result of the foregoing operation may be indicated by various devices; for instance, referring to Fig. 5 which indicates parts of the manometer which forms the subject matter of my application 452,750, the cam 30 engages a pin or roller 49 carried by a frame 50 mounted on a pivot 51. The frame has a pointer and marker 52 to coact with a dial 53. It also determines the speed of a counter 54. And a pointer 55 moving with said cam coacts with a scale 56. A portion of the casing of such a manometer is shown at 57 in Fig. 6.

In place of the train of wheels a group of pulleys E, E$^1$, E$^2$, such as is indicated in Fig. 4 may be employed, movements proportional to four times log. $\varphi$H, four times log. $\psi$P and twice log. XT being given to cords $e$, $e^1$, $e^2$ passing over the pulleys in such a way that a movement proportional to the sum of these logarithms may be obtained. Or again any other convenient means of adding the movements may be employed. The movement proportional to log. Q, thus obtained, is communicated to the logarithmic cam 30', and is by this cam and the intermediate connections converted into a movement proportional to Q itself. Said pulleys actuate a cam 30' in the same manner and for the same purpose as the cam 30 before described, it being understood that the three depending ends of the straps or chains indicated would be connected to the Bourdon tubes 47 and 39 and the float 38.

In all of the forms illustrated the device will operate with accuracy when the values of $\varphi$H, $\psi$P, and XT are greater than about $\frac{1}{10}$ of their maximum value, but when these quantities are very small or smaller than $\frac{1}{10}$ of their maximum value then their logarithms become negative and consequently cannot become represented on their respective cams.

In the embodiment illustrated in Fig. 2, the cam 30 may be supposed to be the same as in Figs. 1 and 5, but it is affected by two pressures instead of three. Its shaft 60 has a bevel pinion 61 meshing with a bevel pinion 62 on the upper end of a shaft 63 of a differential gear mechanism the casing and bearings of which are omitted. On said shaft 63 are a pinion 64 and a bevel gear 65, the latter meshing with a bevel pinion 66 which also meshes with a bevel gear 67, the hub of which carries a pinion 68.

A casing 70 is connected by a pipe 71 with the up-stream side of a Venturi-tube, as at 72. Rising from the bottom of the casing are annular walls 73 and 74, the chamber formed by the inner one containing mercury 75. The annular space or chamber 76 is connected by a pipe 77 with the throat of the Venturi-tube. A bell 78 dips into a body of oil, water, or other suitable liquid 79 around the wall 74, and has a central depending float 80 in the mercury 75. The bell 78 has an upwardly projecting rack 81 meshing with a pinion 82 on a shaft having a bevel pinion 83 which meshes with a bevel pinion 84 on the lower end of a shaft 85. This shaft extends up through a sealing cup 86 and at the upper end has a bearing in a bracket 87 supported by the stand pipe 88 of the casing in which the rack 81 works. The shaft 85 carries a pinion 89 which meshes with the pinion 68 of the differential gear.

A casing 90 is formed with means at 91 and 92 for connections, which will permit a flow of a gas whose quality and hence whose density is to be measured, such as coal gas or producer gas. The same gas, of course, is flowing through the Venturi tube and the connections at 91 and 92 are made so as to form a by-pass for a gentle flow of the gas. The casing contains a quantity of a suitable liquid 93 in which is a float 94 carried by the lower end of a thin walled and light cylinder 95. This cylinder may be inflated to increase its rigidity. From its upper end rises a rack 96 meshing with a pinion 97 on a shaft 98 which, through bevel gearing 99, actuates a shaft 100 the lower end of which is stepped in the bracket 87 and has a pinion 101 meshing with the pinion 64 of the differential gearing. As the density of the gas varies, the pressure in chamber 90 varies and consequently alters the relative buoyancy of cylinder 95. Therefore, through the pinions 101, 89 and the differential gearing, the cam 30 will rotate according to variations in density of the gas and its speed of flow through the Venturi-tube.

As it may sometimes be preferable to employ a differential gear which utilizes only spur pinions and gears, because of the difficulty of cutting bevel gears and pinions so as to avoid the backlash, I may construct the differential gearing on the principle illustrated in Fig. 7 in which there are three pinions 14$^a$, 22$^a$ and 28$^a$, it being understood that said pinions would be engaged by racks in the same manner as the pinions 14, 22 and 28 of Fig. 1 respectively. Then, instead of the bevel gears and the bevel pinions mounted on arms in Fig. 1, I employ small spur pinions 102 and 103 which mesh with small idler spur pinions 104 and 105 carried by arms 106 and 107, said idler pinions meshing with internal gears of disks 108 and 109. In this case, the shaft is divided into two sections 12$^a$ and 12$^b$, and the cam 30 is carried by the shorter section 12$^b$.

Having thus described my invention, what I claim is:

1. In a meter for measuring fluids, a conduit through which the fluid is caused to flow, and means connected with said conduit and controlled by the fluid in response to variations in quantity, pressure and temperature of said fluid for obtaining movements proportional to the logarithms of functions of said variations, and means for adding together said movements to obtain a movement proportional to the logarithms of flow.

2. In a meter for measuring fluids, a conduit through which the fluid is caused to flow, means connected with said conduit and controlled by the fluid in response to variations in quantity, pressure and temperature of said fluid for obtaining movements proportional to the logarithms of functions of said variations, and differential gearing for obtaining the algebraic sum of said movements.

3. In a meter for measuring fluids, a conduit through which the fluid is caused to flow, means connected with said conduit and controlled by the fluid in response to variations in quantity, pressure and temperature of said fluid for obtaining movements proportional to the logarithms of functions of said variations, and means for adding together said movements to obtain a movement proportional to the logarithms of flow, and means for converting the movement thus obtained into a movement proportional to the flow itself.

4. In a meter for measuring fluids, a conduit through which the fluid is caused to flow, means connected with said conduit and controlled by the fluid in response to variations in quantity, pressure and temperature of said fluid for obtaining movements proportional to the logarithms of functions of said variations, and means for adding together said movements to obtain a movement proportional to the logarithms of flow, and a cam for converting the movement thus obtained into a movement proportional to the flow itself.

5. In a meter for measuring fluids, a conduit through which the fluid is caused to flow, means connected with said conduit and controlled by the flow in response to variations in quantity, pressure and temperature of said fluid for obtaining movements proportional to the logarithms of functions of said variations, differential gearing for obtaining the algebraic sum of said movements, and a cam controlled by said gearing.

6. A meter for fluid of varying densities consisting of an integrating device, a cam determining by its position the amount of motion imparted to the integrating device, and means operated by the flow of fluid and influenced by varying the quantity, temperature and pressure thereof for controlling the position of the cam.

7. A meter for fluids of varying densities consisting of a conduit through which said fluid is caused to flow, devices affected by the flow of said fluid and influenced by variations in quantity, pressure and temperature of said fluid in combination with differential gearing provided with several elements, which are connected with said devices, measuring mechanisms, and a cam controlling the measuring mechanism by its position and connected with the gearing whereby the latter as a whole determines the position of the cam.

8. A meter for fluids of varying densities consisting of a device exhibiting the amount of fluid measured, a cam controlling by its position the exhibiting device, differential gearing provided with several elements which as a whole control the position of the cam, and devices operated by the flow of fluid and influenced by variations in temperature, pressure and quantity thereof, and connected to the several elements of the gearing.

9. A meter for fluids of varying densities containing devices each of which is controlled by the flow of the fluid and responding to variations of quantity, pressure and temperature thereof, a plurality of main gears each connected with one of the devices operated by the said variations, and idler pinions between the main gears, whereby the effects of the several variables are combined at the end of the gearing.

In testimony whereof I affix my signature in presence of two witnesses.

FREDERICK N. CONNET.

Witnesses:
   HOWARD E. BARLOW,
   E. I. OGDEN.